United States Patent [19]

Suzuki

[11] Patent Number: 5,743,993
[45] Date of Patent: Apr. 28, 1998

[54] TREAD RING TRANSFERRING APPARATUS FOR USE IN A GREEN TIRE BUILDING SYSTEM

[75] Inventor: Kazuya Suzuki, Shirakawa, Japan

[73] Assignee: Sumitomo Rubber Industries, Ltd., Hyogo-ken, Japan

[21] Appl. No.: 815,940

[22] Filed: Mar. 13, 1997

[30] Foreign Application Priority Data

Mar. 14, 1996 [JP] Japan .................................. 8-057249

[51] Int. Cl.$^6$ .................................................. B29D 30/26
[52] U.S. Cl. ...................... 156/406.2; 156/126; 156/396
[58] Field of Search ............................ 156/406.2, 396, 156/126, 127, 111, 96

[56] References Cited

U.S. PATENT DOCUMENTS 4,634,489  1/1987  Dupommier .................. 156/406.2
5,051,149  9/1991  Ishii ............................... 156/406.2
5,500,074  3/1996  Suzuki .

*Primary Examiner*—Geoffrey L. Knable
*Attorney, Agent, or Firm*—Birch, Stewart, Kolasch & Birch, LLP

[57] ABSTRACT

A tread ring transferring apparatus for use in a green tire building system adapted for holding and transferring a tire component which is formed in a cylindrical shape has a ring shaped holder frame; and a plurality of holding segments provided along a circumferential direction of the holder frame and radially movable inward and outward to hold and release the tire component respectively. Each holding segment has at least one contact member in pressing contact with the tire component when the holding segments are moved radially inward. One contact member of one of the plurality of holding segments is different in height in a radial direction from another contact member of the other holding segment.

7 Claims, 3 Drawing Sheets

TREAD RING TRANSFERRING APPARATUS FOR USE IN A GREEN TIRE BUILDING SYSTEM

BACKGROUND OF THE INVENTION

This invention relates to a tread ring transferring apparatus for use in a green tire building system to hold and transfer a tire component in the form of a cylinder.

Conventionally, in a green tire building system, there is provided a pair of forming drums disposed opposing to each other with a tread ring transferring apparatus (hereinafter merely referred to as a "transfer apparatus") interposed therebetween. One of the forming drums is a tread ring forming drum, and the other is a tire building drum. A tread ring in the form of a cylinder comprising belt, band, and material for tread is formed on the tread ring forming drum, from where the tread ring is transferred to around carcass plies in the form of a cylinder placed on the tire building drum by the transfer apparatus, thereby building a green tire.

Generally, the transfer apparatus is provided with a plurality of holding segments in a circumferential direction thereof at the same interval. These plurality of segments are movable in radial inner and outer directions of the transfer apparatus. Each segment has a holder portion (contact member). The contact member comes into pressing contact with the tread ring, when the segments are moved in their radial inner directions, to thereby hold and transfer the tread ring to the tire building drum.

The above-constructed transfer apparatus has suffered the following problems. When the contact members of these segments are provided in the circumferential direction of the transfer apparatus by the same interval, the tread ring is formed with recesses on the outer circumferential surface thereof, at a position corresponding to the contact members, at the same interval. There has been known from the experiences that the formation of these recesses in the tread ring of tire increases Radial Force Variations (referred to as "RFV" hereinafter) in the higher modes, thus generating undesirable noises during driving of an automotive vehicle at high speeds. "RFV" is one of the measured quantities of the force variation of the tire; they are namely LFV, RFV, and TFV, representing the rigidity of the tire in the respective directions; namely a lateral direction, a radial direction, and a tangential direction with respect to the circumference of the tire. "RFV" in particular is a variation of the measured force (in the unit of Kg) under application of the force such that the tire (or green tire) undergoes deformation in the radial direction by the specific amount.

To solve the above problem, recently, there has been proposed a transfer apparatus provided with contact members in the circumferential direction thereof by a varied interval to thereby reduce RFV of tire in the higher modes. The term "higher mode" hereinafter used has some thing to do with the higher frequencies; which in turn has some relation to the rotational speed of the tire when equipped to a automobile. Thus the higher mode in the certain respect simulates a faster rotational speed of the tire.

The aforementioned transfer apparatus can not completely solve the problem because the freedom of interval variation among the contact members for some instance is constrained by the structural limitations of the holding segments. Accordingly, sufficient reduction of RFV is not always anticipated without changing the size or structure of the holding segment in some instance, leading to the drastic design change, not favored by the industry, according to the conventional device, and thus there is room for improvement.

The above-constructed transfer apparatus is involved with another problem, although this apparatus is effective in reducing RFV. Specifically, providing the contact members at the varied interval makes the standardization much harder for the industry as the parts number increases, leading to an inconvenience in maintaining and administrating of the parts. In view thereof, there is a demand for a novel transfer apparatus in which the structure of segment can be made identical to one another as much as possible while, at the same time, reducing RFV in the higher modes.

SUMMARY OF THE INVENTION

In view thereof, it is an object of this invention to overcome the above-mentioned drawbacks residing in the prior art.

It is another object of this invention to provide a tread ring transferring apparatus capable of reducing RFV of tire in higher modes with a simplified construction.

To accomplish the above objects, the present invention is directed to a tread ring transferring apparatus for use in a green tire building system adapted for holding and transferring a tire component which is formed in a cylindrical shape, comprises: a holder frame in the form of a ring; and a plurality of holding segments provided along a circumferential direction of the holder frame and radially movable inward and outward to hold and release the tire component respectively, each holding segment including:

at least one contact member which is adapted for pressing contact with the tire component when the holding segments are moved radially inward, and a contact member of one of the plurality of segments is different from another projection of the other segment in height in a radial direction.

According to this invention, recesses formed on the tire component in a holding state of tire component by the pressing contact with the contact members of the respective segments have varied depths along the circumferential direction of tire. RFV of tire is affected by the recesses of different depths. Because varying the radial heights of the contact members leaves outer configuration of the tire component unevenly recessed and in turn unevenly peaked along the circumferential direction thereof.

Assuming there are eight contact members in the holder frame; they have equal radial heights and are arranged at equal interval in the circumferential direction of the holding segment. When these contact members press against the tire component, it would result in producing the recesses and in turn peaks at eight points at the same interval respectively along the circumferential direction of the tire component. With the tire component thus constructed, it is known that these equally distanced and projected peaks on the outer surface of the tire component will facilitate formation of the higher RFV along the circumferential direction thereof. Therefore, varying the projected amount of the contact members (even if they are at the same interval along the circumferential direction of the holder frame) unevenly along the circumferential direction of the holder frame, when pressed against the tire component, can produce the peak points on the outer configuration of the tire component which are shifted away from the equally distanced points along the circumferential direction of the tire.

As a result, there can be avoided a phenomenon that the same level of RFV is generated in a short period of time (cycle), as in the tires produced with use of the conventional transfer apparatus in which projections are provided in the circumferential direction by the same interval. Thus, RFV in the higher modes can be reduced.

In one aspect of this invention, the holding segments are provided along the circumferential direction of the holder frame at the same interval, and the contact members of the holding segments are provided along the circumferential direction of the holder frame at the same interval when the holding segments are radially moved inward to hold the tire component.

With this arrangement, the construction of each segment can be made common to one another in an effective way.

In another aspect of this invention, the height of the contact member is set such that the contact members adjacent to each other along the circumferential direction of the holder frame are different in height. Preferably, the height of the contact member is set in the range of 0.5 to 4.0 mm. With this arrangement, RFV of tire in the higher modes can be effectively reduced.

The above and other objects, features and advantages of the present invention will become more apparent upon a reading of the following detailed description and drawings.

DETAILED DESCRIPTION OF THE PREFERRED EMBODIMENTS OF THE INVENTION

A preferred embodiment of the present invention is described with reference to the accompanying drawings.

Figure 1:
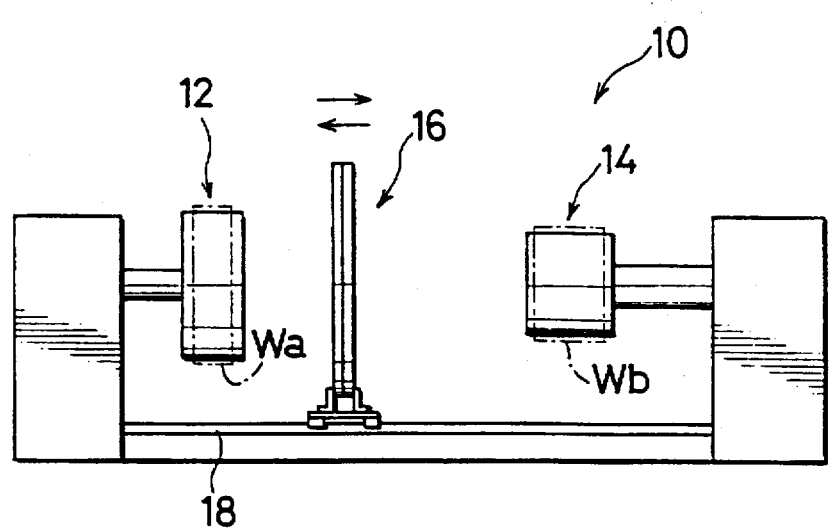
FIG. 1 is a front view of a green tire building system incorporated with a tread ring transferring apparatus according to the invention.

FIG. 1 is a diagram schematically showing a green tire building system incorporated with a tread ring transferring apparatus (hereinafter merely referred to as a "transfer apparatus") embodying the invention. Reference numeral 10 denotes the green tire building system. The system 10 comprises a first forming drum (tread ring forming drum) 12 and a second forming drum (tire building drum) 14, and a transfer apparatus 16. The first and second forming drums 12 and 14 are arranged spaced apart from each other by a specified distance with the transfer apparatus 16 interposed therebetween. The transfer apparatus 16 is reciprocally slidable between the first and second drums 12 and 14 along a pair of parallel rails 18 in the directions shown by the arrows in FIG. 1. In the green tire building system 10, the transfer apparatus 16 transfers a tread ring, formed by the first forming drum 12, to the second forming drum 14 around which carcass plies are wound. Then, the tread ring and the carcass plies are integrally formed to build a green tire.

More specifically, on the first forming drum 12, tire constituent members such as belt, band, and material for tread are attached one over another to form a work Wa (tread ring) in the form of cylinder, whereas on the second forming drum 14, a plurality of carcass plies are attached one over another to form a work Wb also in the form of cylinder. The transfer apparatus 16 removes the work Wa formed on the first forming drum 12 therefrom and transfers the same to the second forming drum 14 on which the work Wb is placed. Then, on the second forming drum 14, the work Wa and work Wb are integrally formed to build a green tire.

Figure 2:
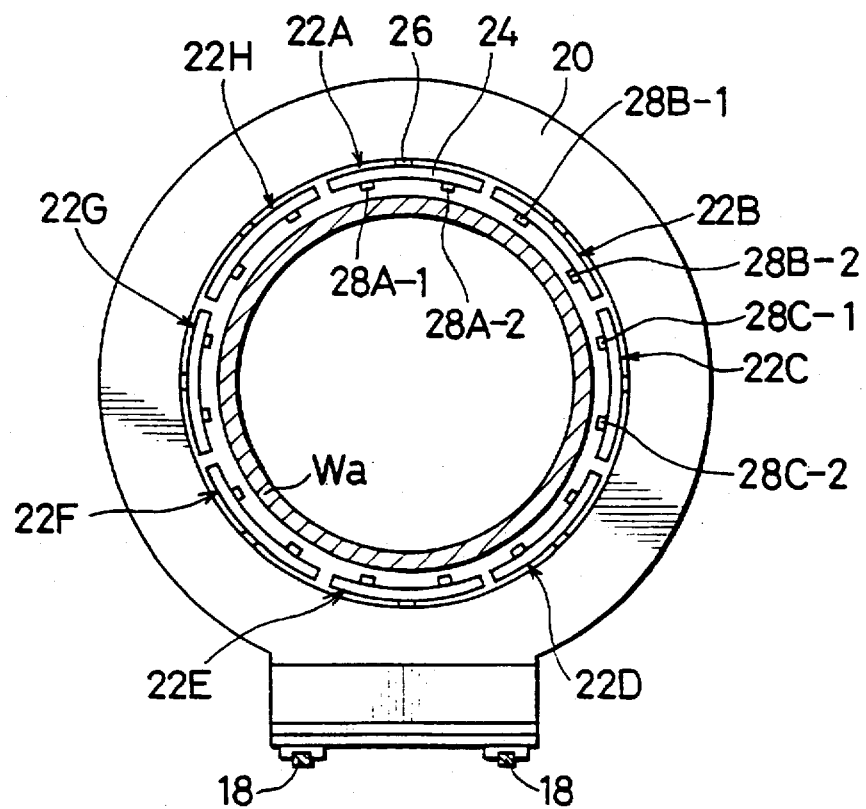
FIG. 2 is a side view of the tread ring transferring apparatus.

FIG. 2 is a diagram showing a construction of the transfer apparatus 16 in details.

The transfer apparatus 16 has a holder frame 20 in the form of a ring. The holder frame 20 is arranged with a plurality of holding segments for holding the work Wa. Specifically, in this embodiment, the holder frame is arranged with eight segments 22A to 22H. The transfer apparatus 16 comprises an expanding/contracting mechanism to expand (radially move outward) and contract (radially move inward) these segments 22A to 22H with respect to the holder frame 20.

As shown in FIG. 2, the holding segments 22A to 22H are arranged inside the ring-shaped holder frame 20 in the circumferential direction thereof at the same interval.

The segments 22A to 22H each has a supporting member 24 in the form of a circular arc. The segment 22A (or 22B, ... 22H) is constructed in such a manner that projection 28 (in this embodiment, two projections) serving as a contact member for holding the work Wa is provided on an inner surface of the supporting member 24. The supporting members 24 are coupled to the expanding/contracting mechanism via a corresponding drive shaft (or a drive arm) 26. In transferring the work Wa, the expanding/contracting mechanism is driven to render the holding segments 22A to 22H hold the work Wa in a state that the work Wa is placed on an inner side of the segments 22A to 22H. It is to be noted that each holding segment has the supporting member 24, drive shaft 26, and projections 28, although, in FIG. 2, such configuration is shown only for the segment 22A.

Although not illustrated, the expanding/contracting mechanism comprises a ring member mounted to the holder frame 20, a cylinder for rotating the ring member about a rotary axis of the holder frame 20, and a link member for converting a rotary movement of the ring member to a radial reciprocal movement of the holding segments. The drive shafts 26 of the respective segments 22A to 22H are coupled to the link member. The holding segments are changed from a tread ring holding state to a tread ring releasing state, and vice versa in the following manner.

Specifically, when the cylinder is driven to rotate the ring member about the rotary axis of the holder frame 20, the segments 22A to 22H are simultaneously moved in radial directions of the holder frame 20. The segments are moved in their inner radial directions to set the holding state, while moved in their outer radial directions to set the releasing state. In the holding state, the projections 28 of each segment come into pressing contact with the work Wa to hold the same from outward.

Figure 3:
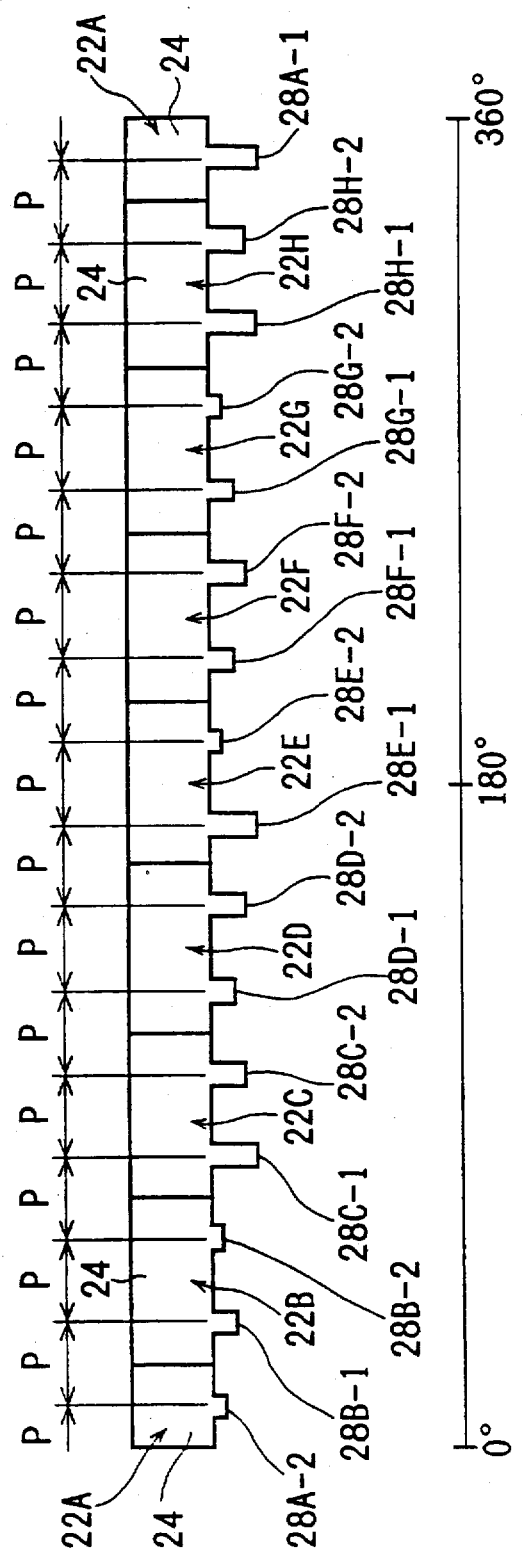
FIG. 3 is a diagram showing an arrangement of projections (contact members)

As described above, each supporting member 24 has two projections 28 arranged along the inner circumferential direction of holder frame (see FIG. 2). For example, the segment 22A has projections 28A-1, and 28A-2, the segment 22B has projections 28B-1 and 28B-2, ... in the circumferential direction of holder frame. Further, as shown in FIG. 3, in the holding state of tread ring, these projections 28 are arranged along the circumferential direction of the holder frame at the same interval P.

Each projection 28 has a flat surface on a lead end thereof. All the projections 28 have the same dimensions with respect to the circumferential direction of holder frame, (in FIG. 3, directions extending left and right sides) and in the widthwise direction of tire (in FIG. 3, forward and rearward directions, orthogonal to the left and right directions). However, the height of projection 28, i.e., dimension in the radial directions of holder frame is set at any of four different values, (a), (b), (c), and (d).

The height of projection is set such that the projections adjacent to each other along the circumferential direction of the holder frame have heights different to each other. Specifically, two projections 28, 28 on one supporting member 24 have the height different from each other. Further, between the supporting members adjacent to each other in the circumferential direction of holder frame, the projection on one supporting member and the projection on the other supporting member, disposed next to each other are different in height. For example, the projection 28A-2 of the segment 22A and the projection 28B-1 of the segment 22B are different in height, the projection 28B-2 of the segment 22B and the projection 28C-1 of the segment 22C are different in height, respectively, and so forth.

In this embodiment, the dimensions of the projection 28 in the circumferential direction and in the widthwise direction of tire are respectively set at 20 mm. As described above, the height of projection 28 is selected from among four different types (a), (b), (c), and (d) shown in TABLE-1. The projections 28 of each supporting member 24 of the segments 22A to 22H have the height arrangement as shown in TABLE-2.

TABLE 1

| type   | a      | b      | c      | d      |
|--------|--------|--------|--------|--------|
| height | 0.5 mm | 1.0 mm | 1.5 mm | 2.0 mm |

TABLE 2

| segment | | | | | | | | |
|---|---|---|---|---|---|---|---|---|
| | 22A | 22B | 22C | 22D | 22E | 22F | 22G | 22H |
| type | d a b | a d c | b c d | a b c | b a d | c |

0° → 360°

More specifically, when the projections 28 of the segments 22A to 22H are arranged in the order mentioned above, recesses formed on the work (tread ring) Wa by the pressing contact with the projections 28 of the segments 22A to 22H in the holding state of tread ring have varied radial depths from one another in the circumferential direction of tread ring. Accordingly, RFV resulting from these recesses is varied along the circumferential direction of tire. Thereby, there can be attained the same effect (reducing RFV) as in the tires fabricated with use of the conventional transfer apparatus in which projections are arranged at a varied interval, i.e., RFV can be reduced. In addition, there can be avoided the phenomenon that the RFV is generated at a relatively shorter time period. Accordingly, although the projections 28, contact members for the work Wa are provided in the circumferential direction of tire at the same interval, tires fabricated with use of the green tire building system 10 incorporating the inventive transfer apparatus can effectively reduce RFV in the higher modes, as shown in the following experimental data.

Experimental Data

TABLE-3 shows results of RFV obtained by conducting the measurement test according to JASO. The measurements were carried out for tire of the size, 165/70R13, mounted on a wheel rim of 4.5JJ×13 inch.

TABLE 3

| | RFV in MODES | | | | | | | | | | |
|---|---|---|---|---|---|---|---|---|---|---|---|
| | 0A | 1H | 2H | 3H | 4H | 5H | 6H | 7H | 8H | 9H | 10H |
| SP1 | 4.9 | 2.6 | 2.4 | 0.5 | 0.6 | 0.4 | 0.2 | 0.1 | 0.1 | 0.1 | 0.1 |
| SP2 | 4.6 | 3.5 | 0.8 | 0.7 | 0.5 | 0.5 | 0.2 | 0.0 | 0.1 | 0.1 | 0.0 |
| SP3 | 3.0 | 1.0 | 1.3 | 1.5 | 0.4 | 0.2 | 0.5 | 0.2 | 0.2 | 0.1 | 0.2 |
| SP4 | 2.7 | 1.3 | 1.4 | 0.7 | 1.1 | 0.4 | 0.3 | 0.1 | 0.2 | 0.1 | 0.1 |
| SP5 | 5.7 | 3.9 | 2.5 | 1.1 | 0.8 | 0.4 | 0.4 | 0.3 | 0.3 | 0.1 | 0.1 |
| SP6 | 4.0 | 1.7 | 0.5 | 1.2 | 1.5 | 0.5 | 0.3 | 0.2 | 0.1 | 0.1 | 0.0 |
| SP7 | 5.8 | 4.2 | 1.0 | 1.3 | 0.9 | 0.6 | 0.4 | 0.2 | 0.1 | 0.1 | 0.0 |
| SP8 | 3.1 | 1.0 | 1.8 | 1.5 | 0.9 | 0.5 | 0.4 | 0.0 | 0.1 | 0.1 | 0.0 |
| SP9 | 2.3 | 0.3 | 1.0 | 0.4 | 1.0 | 0.4 | 0.2 | 0.3 | 0.1 | 0.0 | 0.0 |
| SP10 | 3.8 | 2.1 | 1.0 | 0.7 | 0.7 | 0.7 | 0.2 | 0.1 | 0.1 | 0.2 | 0.0 |
| X | 3.99 | 2.16 | 1.37 | 0.96 | 0.84 | 0.46 | 0.31 | 0.15 | 0.14 | 0.1 | 0.05 |
| σ | 1.17 | 1.28 | 0.63 | 0.39 | 0.3 | 0.13 | 0.1 | 0.1 | 0.07 | 0.04 | 0.07 |

(Unit: Kg)

Where:
SP1 to SP10=tire samples
X=average value of RFV in each column; and
σ=standard deviation of values (RFV) in respective columns.

Figure 4:
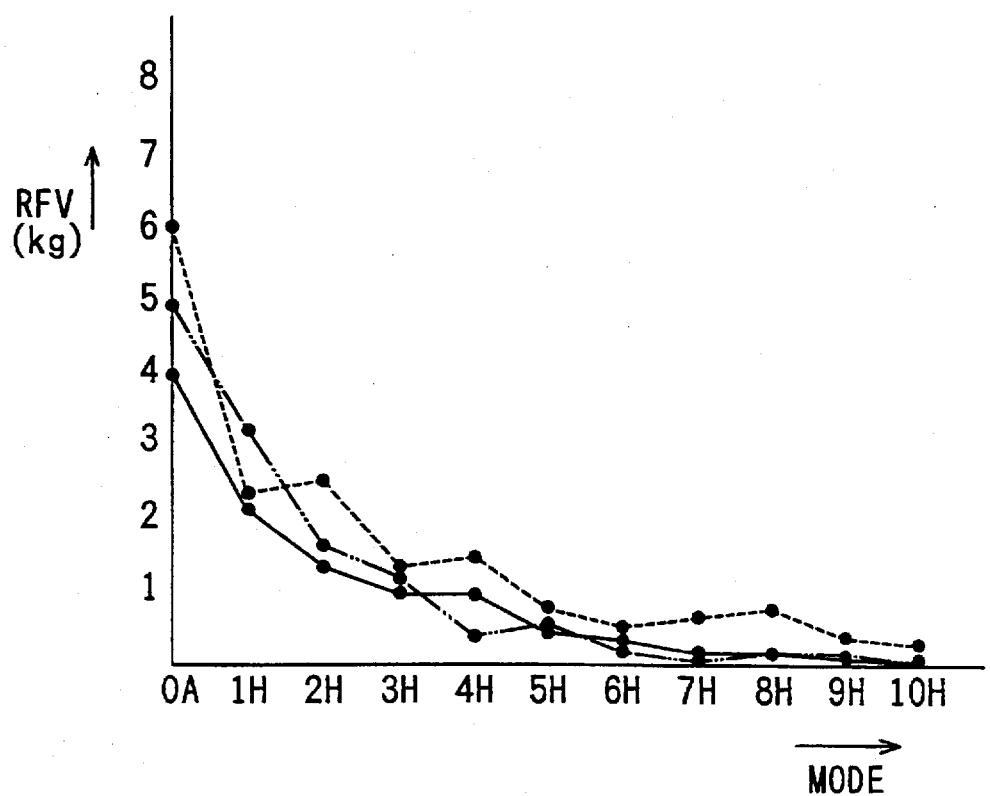
FIG. 4 is a graph showing a relationship between RFV and variation modes.

FIG. 4 is a graph showing a relationship between RFV (mean value) and higher modes regarding the measurement results in TABLE-3. The phantom line and dotted line in FIG. 4 represent the results of measurement regarding tires (comparative tires) fabricated by the conventional green tire building system. Specifically, the phantom line (alternate long and two short dash line) represents the results of measurement for comparative tires fabricated by the conventional tire building system (first conventional system) incorporated with the transfer apparatus in which projections identical to each other in configuration (dimension) are provided along the circumferential direction of tire at a varied interval, whereas the dotted line represents the results of measurement for comparative tires fabricated by another type of conventional tire building system (second conventional system) incorporated with the transfer apparatus in which projections identical to each other in configuration (dimension) are provided along the circumferential direction of tire at the same interval.

As shown in FIG. 4, in the inventive tires fabricated by the green tire building system 10 incorporated with the inventive transfer apparatus 16, RFV in the higher modes can be greatly reduced, compared to the comparative tires fabricated by the second conventional system, although both in the conventional transfer apparatus and in the inventive transfer apparatus, the projections are arranged at the same interval.

Further, RFV in the inventive tires is substantially reduced as low as the comparative tires fabricated by the first conventional system in which the projections are arranged in the circumferential direction of tire at a varied interval. Accordingly, as is apparent from the results of experiment, when the height of projections 28 is differentiated from one another in the above mentioned order, RFV in the higher modes can be effectively reduced.

As mentioned above, when the transfer apparatus 16 of the green tire building system 10 is constructed in such a manner that the projections 28 of the segments 22A to 22H are set at different heights from one another, RFV of a finished tire in the higher modes can be reduced greatly, although these projections 28 are provided at the same interval. With this construction, by detachably mounting the projections 28 to the supporting members 24 by means of bolts or nuts, the segments of substantially the same structure can be used except for the projections 28. Accordingly, the parts constituting the segments 22A to 22H can be made common to one another except the projections 28, with the result that maintenance of tire can be improved and cumbersome operation trying to design the segments different from one another in structure can be avoided. As a result, it enhances a standardization of the parts.

In the foregoing embodiment, the transfer apparatus 16 is constructed in such a manner that the projections 28 are provided at the same interval along the circumferential direction of tire. Alternatively, the transfer apparatus may be constructed in combination with the arrangement of first conventional system. That is, the transfer apparatus as an altered form is provided with the projections different in height along the circumferential direction of tire at a varied interval. With this altered arrangement, RFV of tire in the higher modes can be more reliably reduced because of the combined effect obtained by the feature that the projections are provided at the varied interval and the feature that the height of projection is desirably selected from among a plurality of different values.

To sum up, the transfer apparatus according to the present invention is advantageous in that it can reliably reduce RFV in the higher modes even in a case that the projections cannot be provided at a varied interval due to structural constraints and so forth. This is because merely differentiating the height of projection would surely reduce RFV in the higher modes, as evidenced in the experiment data.

It is to be noted that the number of segments, number of projections on one supporting member, specific configuration of projection, and specific dimension of projection such as height are not limited to the above, but may be optimally set to attain an effect of more reliably reducing RFV in the higher modes, considering various factors such as construction of transfer apparatus, structure of tire to be fabricated, and required performance on tire.

It is desirable to set the height of projection in the range of 0.5 to 4.0 mm in accordance with the structure of tread. Preferably, it may be desirable to set the height of projection in the range of 0.5 to 2.0 mm. This is because of the following reasons.

When the height of projection is smaller than 0.5 mm, it is difficult to effectively reduce RFV of tire in the higher modes, and it is likely to deteriorate the ability of holding the work Wa. In contrast, when the height of projection exceeds 4.0 mm, it impairs an external appearance of tire and also it may likely to adversely affect the uniformity of tire to a non-negligible extent.

The dimensions of projection in the circumferential direction and in the widthwise direction of tire in the foregoing embodiment are respectively set at 20 mm. The effect of reducing RFV in the higher modes is attainable, as far as the dimensions lie within the range of 10 to 30 mm.

If the dimension is smaller than 10 mm, however, a force applied to the tread ring in the holding state becomes too large, thereby impairing an external appearance of tire. On the contrary, if the dimension far exceeds 30 mm, a portion of the projection 28 is abutted against a tread shoulder, thereby impairing the external appearance of tire. In this case, it may also likely to cause a drawback that air remains on an inner side of the tread ring, i.e., in between the uppermost layer of carcass plies and the tread ring in building a green tire.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A tread ring transferring apparatus for use in a green tire building system adapted for holding and transferring a tire component which is formed in a cylindrical shape, comprising:

a holder frame in the form of a ring; and
   a plurality of holding segments provided along a circumferential direction of the holder frame and radially movable inward and outward to hold and release the tire component respectively, each holding segment including:
   at least one contact member which is adapted for pressing contact with the tire component when the holding segments are moved radially inward, and
   a contact member of one of the plurality of segments is different in height in a radial direction from another contact member of another segment.

2. A tread ring transferring apparatus according to claim 1, wherein the holding segments are provided along the circumferential direction of the holder frame at the same interval, and the contact members of the holding segments are provided along the circumferential direction of the holder frame at the same interval when the holding segments are radially moved inward to hold the tire component.

3. A tread ring transferring apparatus according to claim 2, wherein the height of the contact members is set such that the contact members adjacent to each other along the circumferential direction of the holder frame are different in height.

4. A tread ring transferring apparatus according to claim 2, wherein the height of the contact members in the radial direction is set in the range of 0.5 to 4.0 mm.

5. A tread ring transferring apparatus according to claim 1, wherein the height of the contact members is set such that the contact members adjacent to each other along the circumferential direction of the holder frame are different in height.

6. A tread ring transferring apparatus according to claim 5, wherein the height of the contact members in the radial direction is set in the range of 0.5 to 4.0 mm.

7. A tread ring transferring apparatus according to claim 1, wherein the height of the contact members in the radial direction is set in the range of 0.5 to 4.0 mm.

* * * * *